A. A. PINDSTOFTE.
PASTEURIZING APPARATUS.
APPLICATION FILED JUNE 1, 1906.
904,986.
Patented Nov. 24, 1908.
3 SHEETS—SHEET 2.
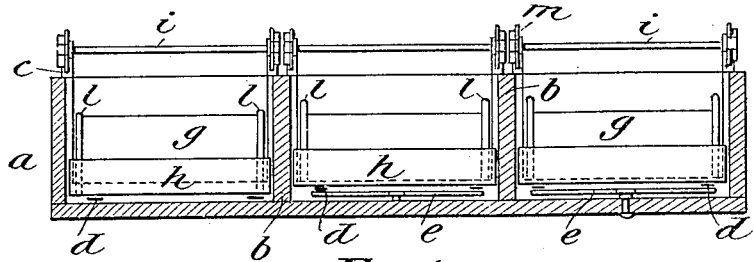
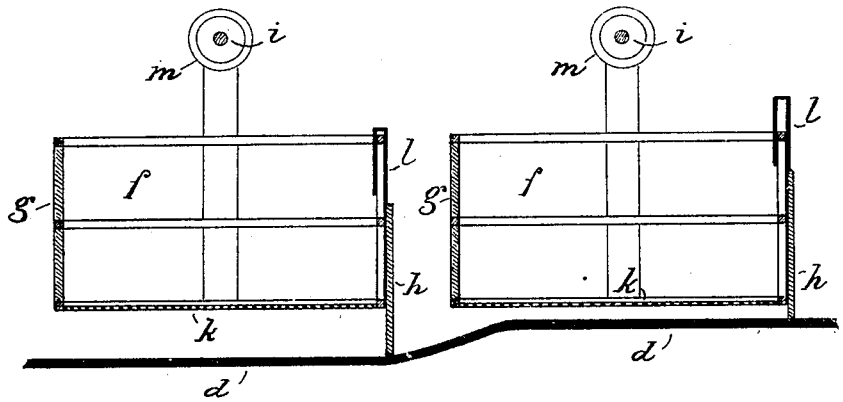

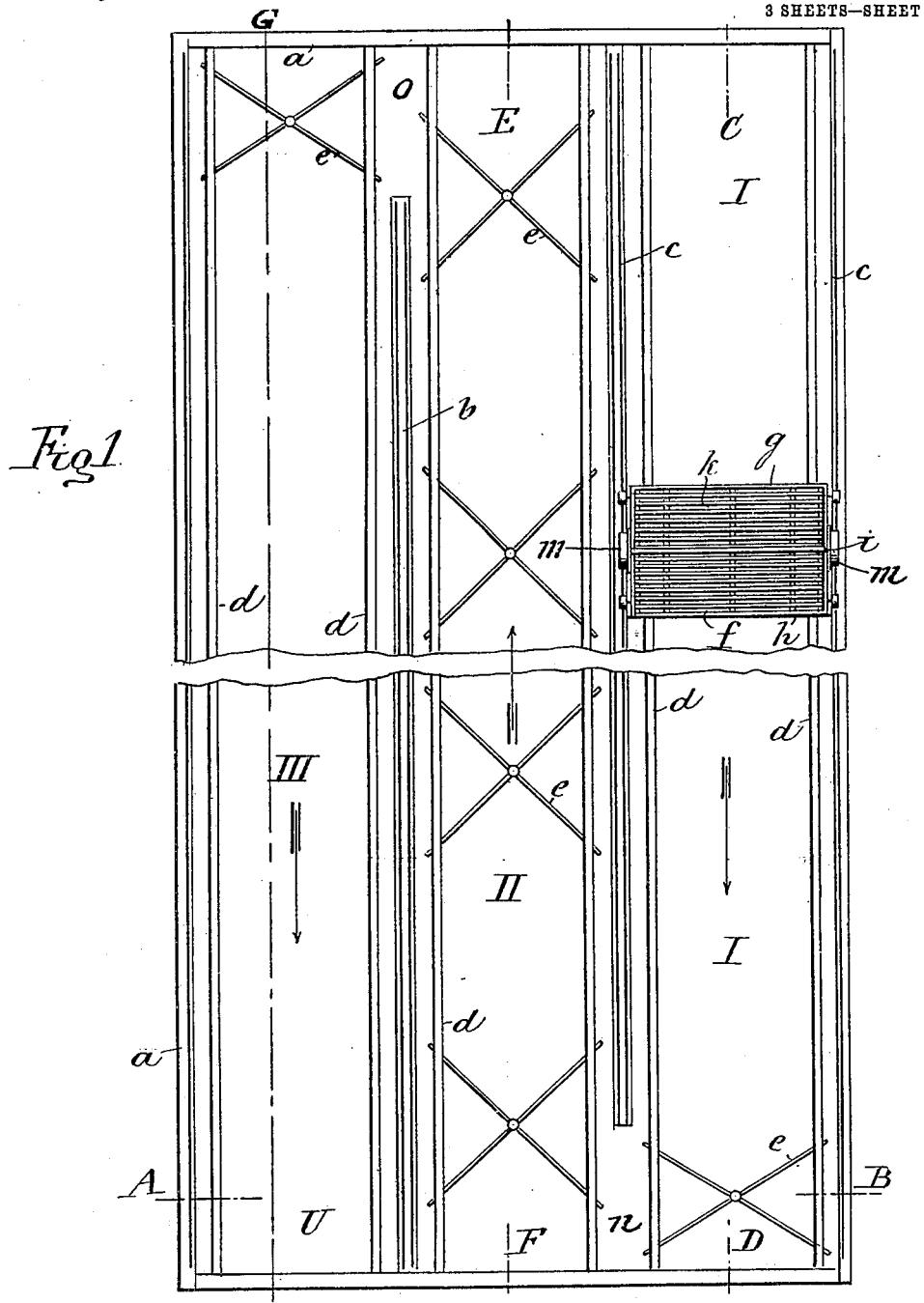

A. A. PINDSTOFTE.
PASTEURIZING APPARATUS.
APPLICATION FILED JUNE 1, 1906.

904,986.

Patented Nov. 24, 1908.
3 SHEETS—SHEET 3.

UNITED STATES PATENT OFFICE.

ANDERS ANDERSEN PINDSTOFTE, OF FREDERIKSBERG, DENMARK.

PASTEURIZING APPARATUS.

No. 904,986.  Specification of Letters Patent.  Patented Nov. 24, 1908.

Application filed June 1, 1906. Serial No. 319,729.

*To all whom it may concern:*

Be it known that I, ANDERS ANDERSEN PINDSTOFTE, manufacturer, of Frederiksberg Alle 62, Frederiksberg, near Copenhagen, Denmark, have invented certain new and useful Improvements in Pasteurizing Apparatus, of which the following is a specification.

The present invention relates to improvements in pasteurizing apparatus of the kind in which the bottles are placed in baskets moved through a water reservoir of suitable dimensions, the bottles being gradually heated in this reservoir to pasteurizing temperature. The water is maintained at pasteurizing temperature as long as required by means of heat supplied to the water by suitable devices, and the bottles afterwards being cooled by means of a cooling medium supplied to the water at a place near the outlet. In such apparatus the pasteurizing fluid is, of course, put into motion when the baskets are pulled or pushed through it, but this motion is not sufficient to cause the warmer water at the top to mix with the colder water at the bottom, and therefore the temperature of the upper water and that of the lower water presents so great differences that a pasteurizing process safe and free of breakage cannot be effected in such apparatus. These drawbacks are obviated in the present invention, the special construction of the baskets producing a perfect mixing of the upper and lower layers of water, during the motion of the baskets, so that the temperature is practically uniform throughout the reservoir.

Figure 3:
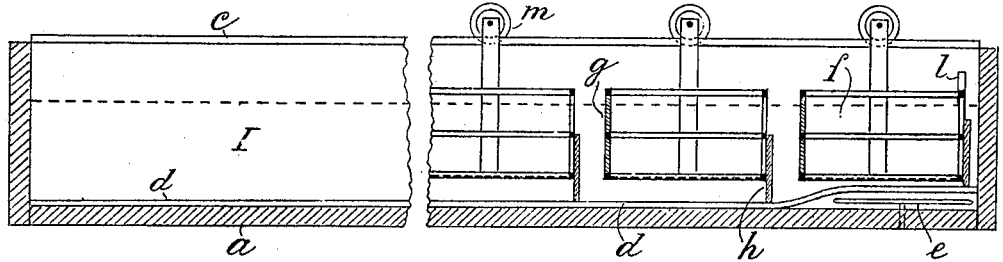
Figure 4:
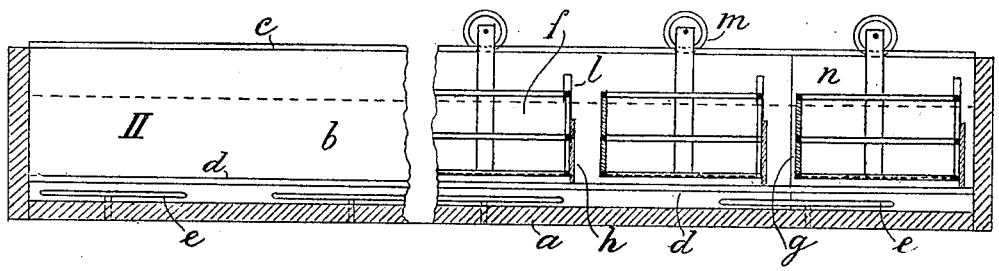
Figure 5:
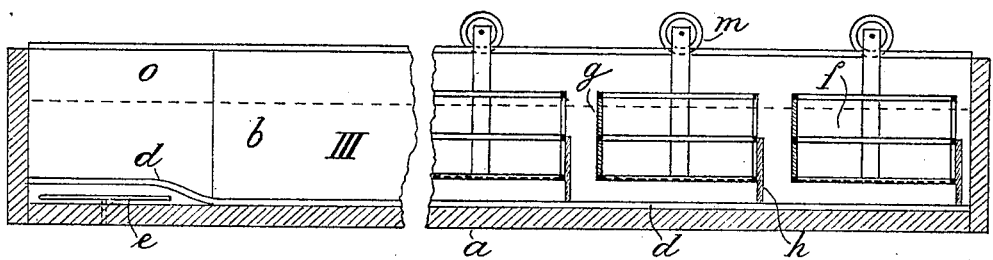

In the accompanying drawings: Figure 1 is a top view of my improved apparatus showing a single basket. Fig. 2 is a vertical section on line A—B Fig. 1. Fig. 3 is a vertical section on line C—D Fig. 1. Fig. 4 is a vertical section on line E—F Fig. 1, and Fig. 5 a vertical section on line G—H Fig. 1. In Figs. 2 to 5 baskets are shown in all of the compartments. Fig. 6 is a longitudinal vertical section, on a larger scale, through two baskets.

The pasteurizing apparatus consists of a rectangular water reservoir $a$, divided into three compartments by partitions $b$. The bottles are inserted and successively attemperated in compartment I. In compartment II the pasteurization itself is effected, and in compartment III the bottles are cooled from which they are removed. In the three compartments the bottle-baskets move in the direction indicated by the arrows. In the right end of compartment I (Fig. 1) and the left end of compartment III are openings $n$ (Figs. 1 and 4) and $o$ (Figs. 1 and 5) respectively in the partitions $b$ through which the baskets can pass from one compartment to the next.

On the side-walls and partitions $b$ of the reservoir $a$ are fixed the rails $c$ and in the bottom of the reservoir are fixed the bottom-rails $d$, which, in the compartments I and III are placed directly upon the bottom of the reservoir and only elevated at the ends which communicate with compartment II. In the latter the bottom rails are also elevated through the whole length of the compartment so that the heating devices $e$, which supply steam or other heating medium to the water can be arranged below the bottom-rails.

Each basket $f$ is of rectangular form and its walls are constructed of slats or bars. One of the end walls $g$ (see Fig. 6) is a fixed wall, which extends from the bottom to the top of the basket, while the other consists of a plate $h$, which by means of hooks $l$ is suspended on the top of the frame of the basket. The plate $h$ rests on the bottom-rails $d$ and extends nearly to the mouth of the bottles, that is to a line some distance below the top edge of the basket. In the bottom of the basket is placed a loose grate $k$, on which the bottles are placed and the baskets are supported by rollers $m$ upon a shaft $i$ fixed to the basket, which rollers run upon the rails $c$ so that the baskets may easily be pushed or drawn through the water. The operation of the apparatus is as follows:—

The baskets containing the bottles are inserted in the left end of compartment I (Fig. 1) and moved through the several compartments in the direction of the arrows. The motion of the baskets causes the pasteurizing fluid to move in the opposite direction so that the fluid-current passes over the wall $h$ sliding on the bottom-rails and then in over the bottles and down between these through the grate $k$ and below the fixed wall $g$, which extends a little above the surface of the water indicated by a broken line in Figs. 3, 4 and 5. It will be obvious that in such a manner the fluid will be thoroughly mixed, so that the bottles in the baskets will be equally heated.

When the baskets pass from compartment

I into compartment II the elevated bottom-rails will lift the loose wall $h$, so that in compartment II the water heated by the steam or other heating fluid, which is furnished by the heating-devices $e$, can flow freely underneath the several baskets, while simultaneously the alternating up and down going motion of the water will continue. By this means the temperature in compartment II, will be maintained practically uniform not only at the top and bottom but also throughout the whole compartment. Further the elevated rails prevent the heating devices from damaging the loose walls $h$.

It is obvious that the invention is not limited to a pasteurizing-apparatus divided into three compartments arranged parallel to each other. Any number of compartments may be employed arranged in any manner which will permit the movement of the basket therethrough to accomplish the desired result.

Having now particularly described and ascertained the nature of the said invention I declare that what I claim is:

1. In an apparatus of the character described, the combination with a water reservoir having means for heating the water, an open bottle-basket movable through said reservoir having its bottom some distance above the bottom of the reservoir and its upper edge a little over the surface of the water, a closed wall fixed to one end of and extending from the bottom to the top of the bottle basket, and a closed vertically movable wall suspended in the opposite end of said bottle-basket and extending from the bottom of the reservoir to some distance below the top of the bottle-basket, and rails fixed to the bottom of the water-reservoir upon which said suspended movable end-wall of the bottle-basket rests during its passage through the reservoir, substantially as and for the purposes set forth.

2. In pasteurizing apparatus, the combination with a water reservoir having heating-devices arranged at the bottom and open bottle baskets movable through said reservoir with their bottom some distance above the bottom of the reservoir and their upper edge a little over the surface of the water of a closed wall fixed to one end of and extending from the bottom to the top of the bottle-basket, and a closed vertically movable wall suspended in the opposite end of the bottle-basket and extending upwards to some distance below the top of the bottle-basket, and rails fixed to the bottom of the water-reservoir but being elevated in that part of it, where the heating-devices are arranged, which rails support the lower edge of the suspended movable end-walls of the bottle-baskets during the passage through the reservoir, substantially as and for the purpose set forth.

In testimony whereof I have signed my name to this specification in the presence of two subscribing witnesses.

ANDERS ANDERSEN PINDSTOFTE.

Witnesses:
MAGNUS JENSEM,
HARAER FROST.